United States Patent [19]
Fast

[11] Patent Number: 5,900,698
[45] Date of Patent: May 4, 1999

[54] FULL BEAM DISCHARGE HEADLIGHT WITH TWO POWER LEVELS

[75] Inventor: Peder Fast, Kullavik, Sweden

[73] Assignee: Ultralux AB, Göteborg, Sweden

[21] Appl. No.: 08/875,007

[22] PCT Filed: Jan. 12, 1996

[86] PCT No.: PCT/SE96/00023

§ 371 Date: Jul. 16, 1997

§ 102(e) Date: Jul. 16, 1997

[87] PCT Pub. No.: WO96/22194

PCT Pub. Date: Jul. 25, 1996

[30] Foreign Application Priority Data

Jan. 16, 1995 [SE] Sweden .................................. 9500125

[51] Int. Cl.[6] ..................................................... B60Q 1/14
[52] U.S. Cl. .............................................. 315/82; 307/10.8
[58] Field of Search ............................... 315/82; 307/10.8

[56] References Cited

U.S. PATENT DOCUMENTS

| | | | |
|---|---|---|---|
| 1,954,806 | 4/1934 | Falge et al. | 307/10.8 |
| 1,971,341 | 8/1934 | Getty | 307/10.8 |
| 3,617,795 | 11/1971 | Peek | 315/82 X |
| 3,621,331 | 11/1971 | Barron | 315/207 |
| 5,191,266 | 3/1993 | Futami et al. | 315/82 X |
| 5,382,877 | 1/1995 | Katsumata et al. | 315/82 |
| 5,463,287 | 10/1995 | Kurihara et al. | 315/308 |

FOREIGN PATENT DOCUMENTS

| | | |
|---|---|---|
| 3436391 | 1/1986 | Germany . |
| 4020878 | 1/1991 | Germany . |

*Primary Examiner*—Robert Pascal
*Assistant Examiner*—Justin P. Bettendorf
*Attorney, Agent, or Firm*—Alfred J. Mangels

[57] ABSTRACT

A method for controlling the full-beam headlights of automotive vehicles, particularly cars, which headlights are provided with dischargeable light sources. The light source (2) is chosen so that when supplying the light source with its nominal power it will produce a luminous flux which greatly exceeds the luminous flux that is standard for full-beam lighting, supplying the light source (2) with a lower power causes the light source (2) to produce a luminous flux which is normal for full-beam lighting. A power level selection (7; 10, 4) is provided for enabling the light source (2) to be supplied selectively with the lower power or with its nominal power.

7 Claims, 1 Drawing Sheet

FULL BEAM DISCHARGE HEADLIGHT WITH TWO POWER LEVELS

BACKGROUND OF THE INVENTION

1. Field of the Invention

The present invention relates to a method and to an arrangement for controlling the headlights of automotive vehicles, and in particular car headlights.

2. Description of the Related Art

The design of modern cars in which the front part of the car dips makes it difficult to fit extra lights effectively. Extra lights impair the appearance of the car, constitute a greater accident risk to unprotected road users and make the car more difficult to wash. Extra lights also impair the aerodynamics of the car and have a negative effect on engine cooling, since they are normally fitted in front of the engine radiator.

There is a significant need to improve full-beam lighting for certain categories of drivers who drive in certain regions, and particularly with respect to certain markets, even though conventional headlights will satisfy many users.

It has become progressively more usual for car owners to replace standard bulbs in existing headlamps with bulbs of greater power, in order to obtain more powerful full beam lighting. However, bulbs of greater power damage the reflectors, by changing the reflectance of the reflectors as a result of higher temperature in the headlamp. The higher temperature can even deform the reflectors, resulting in a distorted light image.

Furthermore, a more powerful bulb has the drawback of necessitating that the driver dip the lights earlier when driving in the dark on a typical road with repeated encounters with oncoming traffic interspersed with a clear road ahead, so as not to dazzle the drivers of oncoming traffic, as opposed to the case when using a standard bulb. This means that the driver's eyes must constantly become accustomed to strong light, i.e. when the lights are on full beam, and a much weaker, dipped light, where dipped lighting is used over a longer distance to prevent dazzling of oncoming traffic. This drawback is the reason why drivers do not normally have extra lights, such as long-distance lighting, switched-on when driving along roads on which oncoming vehicles are frequently encountered, therewith requiring the lights to be dipped repeatedly.

This problem is solved in accordance with the present invention by providing weak headlights for certain situations while eliminating the aforesaid drawback and, at the same time, eliminating the need of extra lighting.

SUMMARY OF THE INVENTION

The present invention thus relates to a method of controlling the full-beam lighting of automotive vehicles, particularly for cars, wherein the headlights are provided with light sources of a dischargeable type. The light source is chosen so that when supplied with its nominal or rated power, it will produce a luminous flux which greatly exceeds the normal luminous flux of full-beam lighting. In order to obtain a luminous flux which is normal for full-beam lighting, the light source is supplied with lower power; and means are provided for selectively supplying the light source with said lower power or with its nominal power.

The invention also relates to a control arrangement for carrying out the method.

BRIEF DESCRIPTION OF THE DRAWINGS

The invention will now be described in more detail with reference to an exemplifying embodiment thereof and with reference to the accompanying drawings, in which.

DESCRIPTION OF THE PREFERRED EMBODIMENTS

Figure 1:
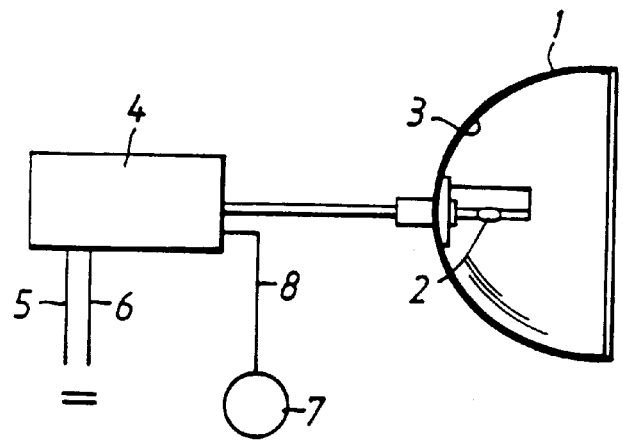
FIG. 1 illustrates schematically a headlamp and associated power means.

FIG. 1 illustrates an arrangement for controlling the full beam headlights of automotive vehicles, particularly cars, wherein headlight 1 is provided with light sources 2 of a dischargeable kind. The reference numeral 3 in FIG. 1 identifies the headlight reflector. Such light sources are available commercially and marketed, among others, by PHILIPS under the trade name MICRO POWER-LIGHT.

Such light sources 2 are powered by a power means 4 which applies an alternating voltage across the light source. The voltage applied is normally a square-wave voltage. Such power means are also known and available commercially.

When applied to a car or to some other automotive vehicle, the power means 4 is connected to the vehicle electrical system by cables 5, 6 which supply the power means with direct current voltage.

According to the invention, the light source 2 is designed to produce a luminous flux which greatly exceeds the normal luminous flux of full-beam lighting when supplied with its nominal power. According to the invention, the power means 4 is designed to supply the light source 2 with lower power when in a first position, such as to emit from the headlight 1 a full beam having a luminous flux which is normal for a full beam. Also provided is a means 7 with which the power means 4 can be switched selectively from said first position to a second position in which the power means supplies the light source 2 with its nominal power.

According to one preferred embodiment of the invention, this lower power is between 40% and 70% of the nominal or rated power, preferably about 50%.

A full beam will normally have a luminous flux of 1,500 lumens for instance. This means that a preferred embodiment of the light source will generate a luminous flux of 3,000 lumens at nominal power.

According to one preferred embodiment of the invention, there is used a discharge lamp of the aforesaid kind having a nominal power of 35 Watts. In the case of standard head-lights, this light source will produce a luminous flux of 3,000 lumens when supplied with its nominal power. When supplied with a power of 18 Watts, the light source will produce a luminous flux of 1,500 lumens.

Conventional full-beam headlights, i.e. a headlight which emits a full-beam lobe, will generate a normal luminous flux when the light source is supplied with a power of 18 Watts. This means that when the light source is supplied with a power of 35 Watts, the light emitted by the headlight will correspond to a normal full beam in combination with a conventional long-distance headlight, because of the higher luminous flux. Such long-distance headlights are normally fitted to the vehicle as extra lighting.

According to one preferred embodiment of the invention, the means 7 includes a driver-operated switch, by means of which the power means can be switched between two said positions.

The switch is connected by means of a cable 8 to an appropriate known control circuit not shown which is conveniently integrated with the power means and which functions to control the power output of said power means by voltage-regulating the output voltage and/or output current of the power means.

When the driver alternates between full beam and dipped beam in a normal manner, the beam will be switched between dipped lighting with a predetermined luminous flux given by the light source for dipped lighting and a full beam with the lower power input when the switch is in its first position, i.e. a full beam with normal luminous flux. When the switch is in its second position, the vehicle lighting will be switched between said dipped lighting and a full beam lighting having the higher power input, i.e. lighting which corresponds to normal full-beam lighting in combination with long-distance lighting. This embodiment can be applied irrespective of whether the dipped-beam headlights and the full-beam headlights are mutually separate or integrated in one and the same headlamp unit.

Figure 2:
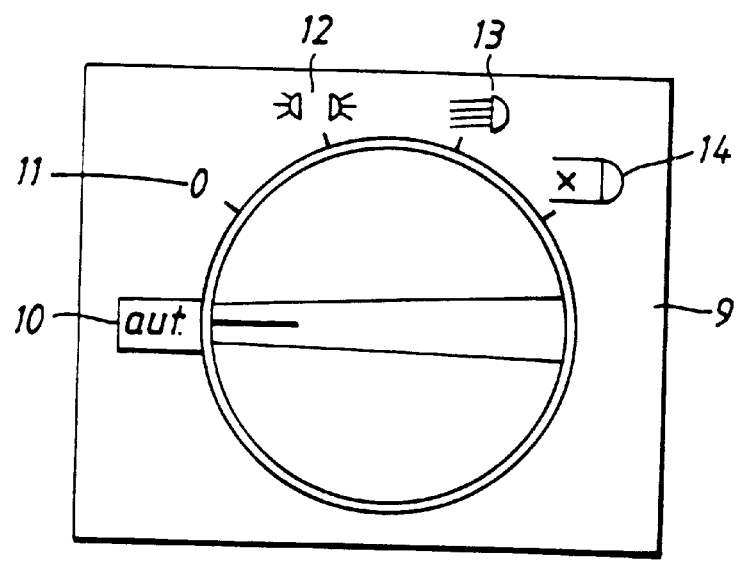
FIG. 2 illustrates a light switch.

The switch may be an integral part of the normal light switch in a car or some other automotive vehicle. FIG. 2 illustrates an example of one such light switch 9.

The reference numeral 10 identifies automatic activation of the vehicle lights when the vehicle is started, for instance activation of the vehicle side lights and dipped/full beam lighting. All lights are switched off in position 11. A position light or the like is ignited in position 12.

Normal dipped lighting and normal full-beam lighting are activated in position 13. This enables the power means to drive the light source 2 at the lower power input. The driver alternates between dipped beam and full beam with the standard full beam switch, normally a lever placed on the steering wheel.

Standard dipped lighting with the stronger full-beam lighting is activated in position 14. This enables the power means to drive the light source 2 at its nominal power input. The driver alternates between dipped lighting and full-beam lighting with the aid of the standard full-beam switch.

Thus, the present invention obviates the need to fit extra lighting to the vehicle while still obtaining, when desired, the quality of light that an extra light would provide.

This eliminates the problems mentioned in the introduction. Although the invention has been described above with reference to a number of exemplifying embodiments thereof, it will be understood that modifications can be made. For instance, it is conceivable to include more than two power positions. Furthermore, light sources with other nominal power inputs can be chosen. The switch means 7 can also be constructed as a separate switch means. Furthermore, the invention may be applied to only one of the vehicle headlights or to both headlights. It is also conceivable to utilize the invention in the aforedescribed manner but in conjunction with a full-beam headlight which is also constructed for dipped lighting.

The present invention is not therefore limited to the described and illustrated embodiments thereof, since variations and modifications can be made within the scope of the following claims.

What is claimed is:

1. A method for controlling the full-beam headlights of an automotive vehicle, said method comprising the steps of:

providing a power source that is operable to provide power at each of a first, nominal power level and a second power level that is a lower power level than the first power level;

providing a headlight that includes a discharge lamp light source that is operable at two different power levels and that emits full-beam luminous flux at a first full-beam flux level when the light source is provided with electrical power at the first, nominal power level, and that emits full-beam luminous flux at a second full-beam flux level that is lower than the first full-beam flux level when the light source is provided with electrical power at the second power level;

providing a power level selector switch that is switchable between a first position corresponding with the first power level and a second position corresponding with the second power level to selectively control the level of power applied by the power source to the light source;

operating the power level selector switch between the first switch position to provide electrical power to the light source at the first power level to cause the light source to provide full-beam light at the first full-beam flux level, and the second switch position to provide electrical power to the light source at the second power level to cause the light source to provide full-beam light at the second luminous flux level, wherein the first full-beam flux level is greater than the second full-beam flux level; and providing a beam selector switch for selectively operating the headlight at one of a full-beam position and a dipped-beam position, wherein the full-beam position of the beam selector switch provides full-beam light from the light source at a luminous flux level that is dependent upon the position of the power level selector switch, and wherein the dipped-beam position of the beam selector switch provides light at a predetermined dipped-beam luminous flux level that is the same level for each of the first and second positions of the power level selector switch.

2. A method according to claim 1, wherein the second power level is between about 40% and about 70% of the first power level.

3. A method according to claim 1, wherein the power level selector switch is included as a part of a light switch provided for controlling the operation of exterior lights of the vehicle.

4. A method according to claim 1, wherein the second power level is about 50% of the first power level.

5. An arrangement for controlling the light intensity of full-beam headlights of automotive vehicles, said arrangement comprising:

a headlight having a discharge lamp light source wherein the headlight emits full-beam luminous flux at a first full-beam flux level when the light source is provided with electrical power at a first, nominal power level, and that emits full-beam luminous flux at a second full-beam flux level that is lower than the first full-beam flux level when the light source is provided with electrical power at a second power level lower than the first power level;

a power source electrically connected with the headlight to supply an alternating voltage across the light source, wherein the power source is operable to provide power at each of a first, nominal power level and a second power level that is a lower power level than the first power level;

a power level selector switch for selectively controlling the level of power applied to the light source, wherein the power level selector switch is operable between a first switch position that provides electrical power to the light source at the first power level to cause the light source to provide full-beam light at the first full-beam flux level, and a second switch position that provides electrical power to the light source at the second power level to cause the light source to provide full-beam light at the second luminous flux level, wherein the first full-beam flux level is greater than the second full-beam flux level; and a beam selector switch for selectively operating the light source at one of a full-beam position and a dipped-beam position, wherein the full-beam position of the beam selector switch provides light from the light source at a luminous flux level that is dependent upon the position of the power level selector switch, and wherein the dipped-beam position of the beam selector switch provides light at a predetermined uniform dipped-beam luminous flux level for each of the first and second positions of the power level selector switch.

6. An arrangement according to claim 5, wherein the second power level is between about 40% and about 70% of the first power level.

7. An arrangement according to claim 5, wherein the second power level is about 50% of the first power level.

* * * * *